United States Patent [19]

Swan et al.

[11] Patent Number: 5,090,617

[45] Date of Patent: Feb. 25, 1992

[54] INCUBATOR HEATING SYSTEM

[75] Inventors: Alan J. Swan, Portland; Tuan A. Trinh, Beaverton, both of Oreg.

[73] Assignee: NAPCO Scientific Company, Tualatin, Oreg.

[21] Appl. No.: 486,066

[22] Filed: Feb. 28, 1990

[51] Int. Cl.⁵ ............................................. A01K 41/00
[52] U.S. Cl. ............................................. 236/3; 237/3
[58] Field of Search ............................ 236/2, 3, 4, 5, 6; 237/3, 14, 15; 119/35, 36, 37, 39, 41, 42; 219/476, 452, 478; 392/339, 344

[56] References Cited

U.S. PATENT DOCUMENTS

3,848,569  11/1974  Folsom .................................. 119/37
4,039,775  8/1977  Andra .................................. 219/385
4,572,427  2/1986  Selfridge et al. .................. 236/3

Primary Examiner—Henry Bennett
Attorney, Agent, or Firm—Dellett, Smith-Hill and Bedell

[57] ABSTRACT

An automatic incubator comprises a chamber surrounded by a water jacket and insulation and provided with temperature and gas level sensors, a gas injection solenoid valve and separate water jacket and air heaters together with microprocessor proportional-integral-derivative control for regulating temperature and gas concentration within the chamber. A fan is provided to circulate gas within the chamber and distribute heat. Manual set controls for selecting desired temperature and gas levels are provided as well as temperature and gas level displays, high and low temperature and gas indicators, and a low water jacket level indicator.

15 Claims, 9 Drawing Sheets

INCUBATOR HEATING SYSTEM

The present invention relates to laboratory incubators and more particularly to a system for heating and controlling the atmosphere in an incubator.

BACKGROUND OF THE INVENTION

Incubators are typically used for growing cultures in a controlled environment wherein both temperature and atmospheric gas concentration are maintained at selected levels. For certain applications it is highly desirable to have both temperature and gas concentrations maintained within strict tolerances while still allowing easy access to the incubator chamber for adding or removing items to and from the chamber or for inspecting the contents of the chamber. Control of environmental variables is desirable to maintain accuracy and reproducability of incubation results. Typical incubators have used either open-coil heaters within the incubator chamber or water jackets surrounding the incubator chamber wherein the water jacket is heated and heat is transferred to the chamber. However, while such configurations can be effective in heating an incubator, they do not necessarily provide as strict a control on the incubator temperature as is desirable for consistent results.

Conventional air heater type incubators lack the temperature stability of the water jacket type. However, according to prior water jacket technology, water jacket temperature is regulated at the desired incubator internal temperature, and opening the door will cause the air temperature to drop rapidly until the door is closed whereupon the temperature begins to recover. The rate of recovery is proportional to the difference in water jacket and the internal air temperature, with recovery slowing as the air temperature approaches the water jacket temperature. A typical full recovery requires approximately forty minutes. If the door is opened more than once every forty minutes, the desired operating temperature would never be attained. Moreover, over-controlling the temperature of the water jacket can cause excessive overshoot because of the delayed response of the water jacket to applied heat.

Therefore, it would be desirable to provide an incubator having more accurate temperature control.

SUMMARY OF THE INVENTION

In accordance with the present invention, in a preferred embodiment thereof, an incubator is provided with a heated water jacket, an air heater in an internal air-flow of the incubator where the air is circulated, and microprocessor control. The microprocessor reads environment control settings selected by an operator and governs heating and gas level controls in response to the settings and sensor inputs proximate the air flow. The microprocessor employs a proportional-integral-derivative program to provide accurate control of temperature and atmospheric gas levels. The incubator is able to react to the chamber door being left open for a reasonable period and can respond accurately while preventing excessive waste of environmental gas and excessive heater operation.

It is accordingly an object of the present invention to provide an improved incubator control system which accurately maintains environmental levels within an incubator chamber.

It is a further object of the present invention to provide a water jacket incubator which includes proportional temperature control.

It is yet another object of the present invention to provide an improved incubator system which is easily calibrated.

It is another object of the present invention to provide an improved incubator which requires less control circuitry.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
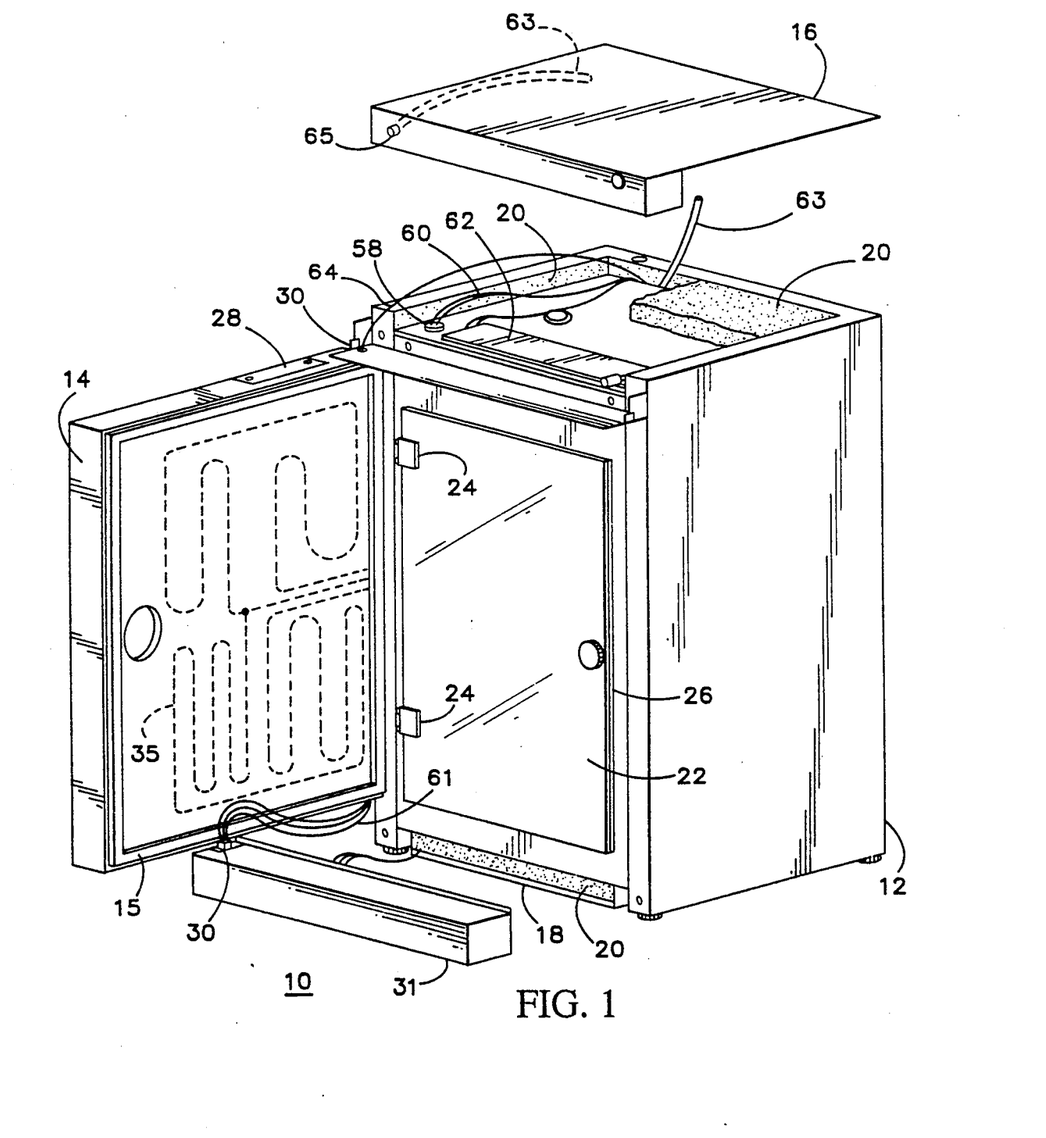
FIG. 1 is an exploded perspective view of an incubator according to the present invention.

Referring to FIG. 1, an incubator 10 comprises a cabinet with an exterior shell 12 which, in a preferred embodiment, is of box-like shape with rectangular sides and a door 14 attached to shell 12 via top and bottom hinges 30. The incubator includes a top 16 and a bottom 18 which attach to exterior shell 12 for completing a box-like enclosure. Lower cabinet cover 31 attaches to the face of incubator 10, below door 14, to prevent exposure of the base of the incubator.

Moving inwardly towards the center of the incubator from the outer shell, the incubator employs an insulating layer 20 surrounding the top, bottom and three sides of the inner portions of the incubator. The incubator door 14, which covers a fourth side of the incubator, also includes an inner insulating layer not shown in FIG. 1. The insulating layer 20 may consist of Fiberglas or other suitable insulating material. The door 14 is able to swing outwardly to provide access to the inner portions of the incubator or to swing inwardly thereby closing the incubator to the outside. The incubator further comprises an inner door 22 which, in a preferred embodiment, is constructed of glass, and which is attached to the incubator body by means of hinges 24 allowing door 22 to swing outwardly and inwardly permitting access to the inner chamber. The use of a glass inner door enables the user to inspect the interior of the incubator without opening the incubator's inner chamber, thus minimizing loss of heat and atmosphere from the chamber interior. Glass door 22 is provided with a gasket 26 around the perimeter of the door to form a vapor seal and further minimize temperature and atmospheric gas concentration fluctuations. Door 14 also employs a gasket 15 running around the outer edges of the inner face of the door, gasket 15 in a preferred embodiment being formed of a foam-filled magnetic material, with the foam providing physical shock damping to minimize disturbing the contents of the incubator when closing the door, as well as providing magnetic attraction for holding the door closed. Located at the top of the exterior face of door 14 is control panel 28 used for setting various controlled environmental factors.

Figure 5:
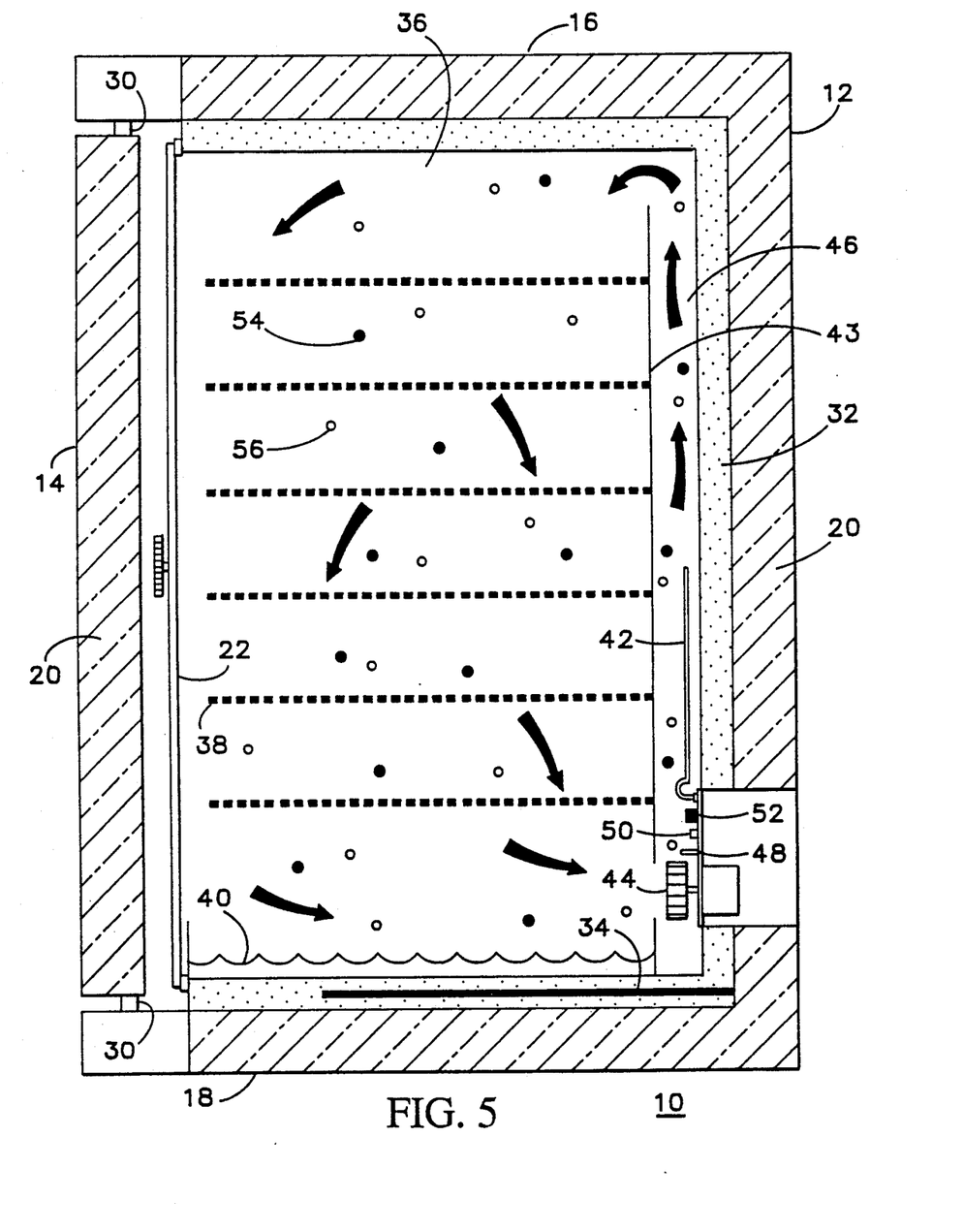
FIG. 5 is a cutaway side view of the incubator of the present invention.

Referring now to FIG. 5, comprising a cutaway side view of incubator 10, the interior construction of the incubator will be discussed in greater detail. The incubator employs a water jacket 32 which surrounds the inner chamber on the top, bottom and three sides. Water jacket 32 is located between the inner chamber and insulating layer 20, but does not extend across the opening created by doors 14 and 22. Contained within water jacket 32 is an electrically operated heating element 34 supplying heat to maintain water jacket 32 at a desired temperature. Heat is distributed through the water jacket by convection; however, it is feasible to add an additional circulation device within the water jacket to distribute heat in an active manner. Heater 34 is placed at the base of water jacket 32 in the preferred embodiment of this invention, since such placement provides the most effective convection, and while only one heating element 34 is illustrated, it is possible to place multiple heating elements within the water jacket. The interior walls of water jacket 32 form a rectangular chamber comprising the inner chamber 36 of the incubator.

In addition to the heating supplied by water jacket heater 34, the incubator is also provided with an air heater 42 located at the rear of chamber 36 directly above a fan 44 which causes air flow 46 for distributing heat and atmospheric gas uniformly throughout chamber 36. The above configuration, having the heater located above the fan in the air flow path, is desirable in that the most efficient heat transfer from element 42 is available thereby producing a more uniform temperature throughout the chamber. Both fan 44 and heater element 42 are located within an air channel at the rear of chamber having an intake at the lower end of the chamber central of fan 44 which then directs air flow over heating element 42 and upwardly to the top of the air channel where the flow is then directed out into the chamber. The air channel is formed by false rear wall 43, positioned in a plane parallel to and in front of the rear wall of the chamber at the rear of chamber shelves 38.

Located between fan 44 and heating element 42 is a temperature sensor 48 which provides an indication of temperature fed to control circuitry of the incubator as will be discussed herein when referring to FIGS. 2, 3 and 4. Located above temperature sensor 48 but below heating element 42 are $CO_2$ injector 50 and $CO_2$ sensor 52. Chamber heater 42 and $CO_2$ injector 52 are controlled by circuitry which operates in response to signals from temperature sensor 48 and $CO_2$ sensor 50 as will be discussed hereinafter. The inner chamber 36 will normally have an atmosphere which consists of a mixture of room air 54 and $CO_2$ 56 injected from $CO_2$ injector 52; while carbon dioxide is indicated as the injected gas, it is possible to employ other types of gas with appropriate sensor apparatus.

Contained within chamber 36 are a number of shelves 38 which can be removable or fixed and which provide surfaces for placement of items within the incubator. Shelves 38 are, in a preferred embodiment, perforated to allow uniform air flow throughout the chamber, although it would be possible to arrange imperforate shelves in a manner wherein flow of gas is directed across the various levels in alternating directions. Chamber 36 further contains a humidity source 40, located at the base of the chamber, for maintaining a moist environment. Humidity source 40 will typically comprise an open reservoir of water.

Referring again to FIG. 1, incubator 10 is also provided with a float switch 58 located at the top of water jacket 32 for indicating fluid le. 1, the float switch being connected to the control circuitry, as discussed in connection with FIGS. 2, 3 and 4, via sensor wires 60 located above the water jacket. Between insulation layer 20 and water jacket 32 is another heating element 62 which aids in preventing formation of a cool spot at the top of the water jacket. Heating element 62 is positioned near the front top of the cabinet, preferably above glass door 22.

Incubator 10 further employs an atmosphere sample tube 63 which extends from the rear of the inner chamber of incubator 10 up the back of the incubator between case 12 and insulation 20 and over the top of the inner chamber, terminating at sample valve 65 which is located at the front of the incubator cabinet above door 14. Sample hose 63 and sample valve 65 allow a sample of the atmosphere within the inner chamber of the incubator to be taken without opening the incubator.

FIG. 1 also illustrates control wires 61 which provide power to an internal door heater 35 which can be located behind the interior face of door 14. The control wires extend from the door heater through the base of door 14 and into the incubator cabinet. As mentioned before, door 14 holds control panel 28, which is connected to the control circuitry of FIG. 2 via control cable 64.

Figure 3A:
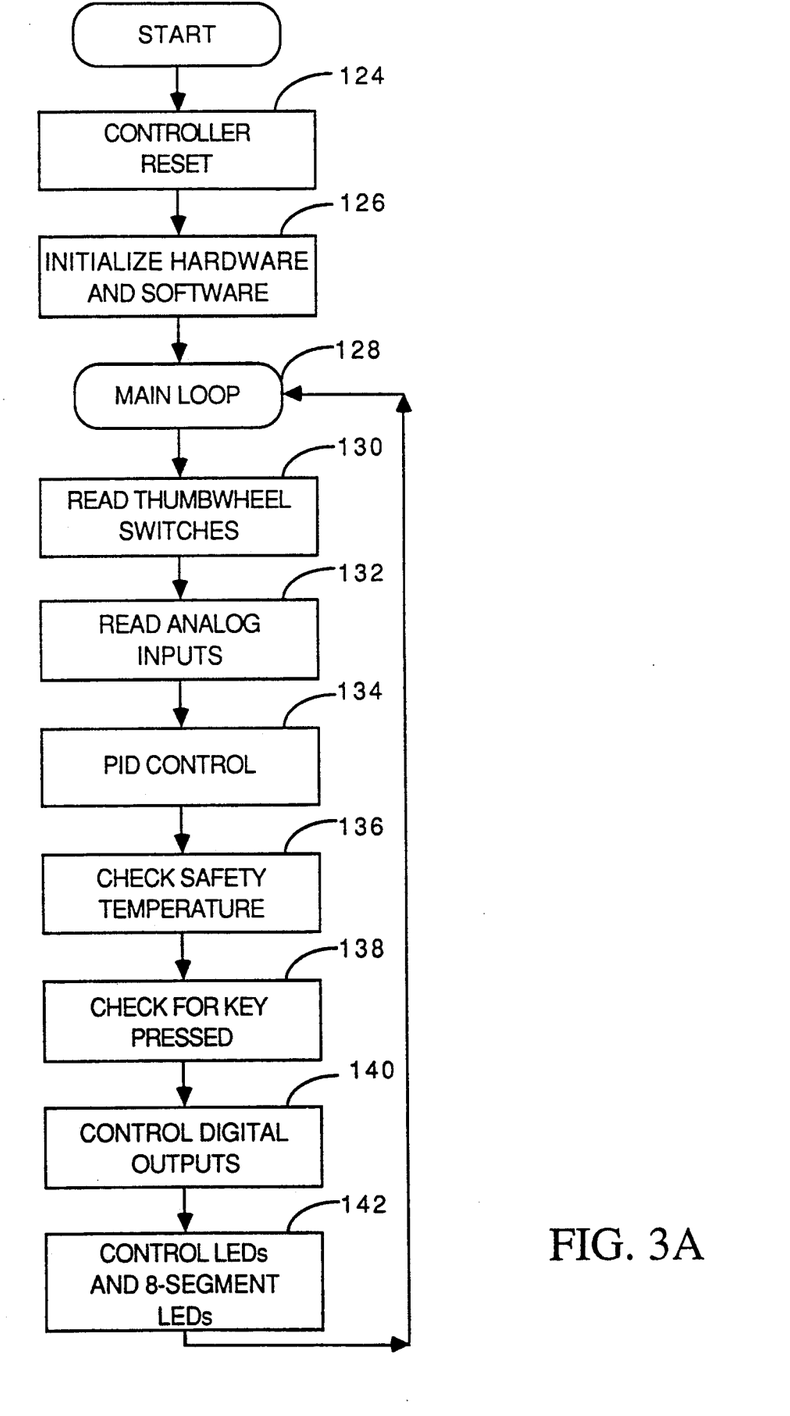
FIG. 3A is a flow chart illustrating the sequence of operations performed by the control software of the incubator according to the present invention.
Figure 4:
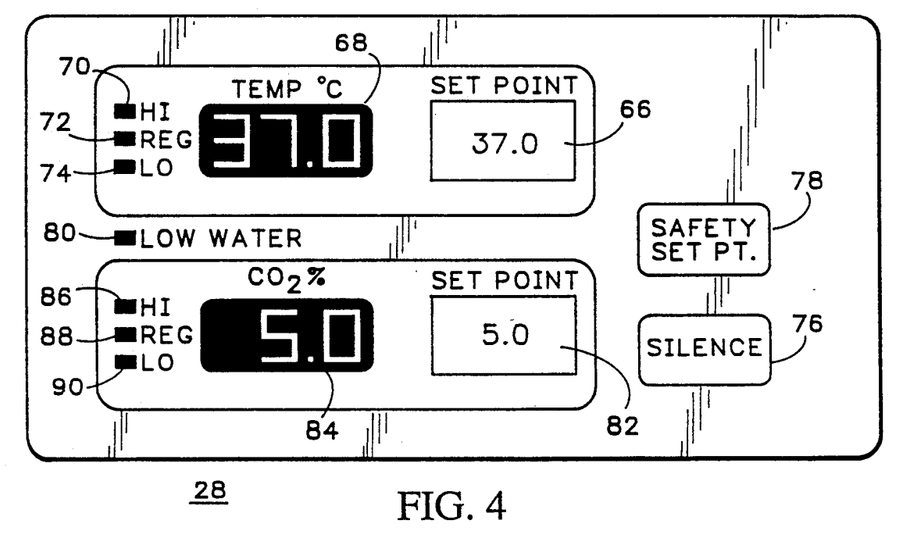
FIG. 4 illustrates the display and control panel of the incubator of the present invention.

Referring to FIG. 4, the control panel 28 is depicted. Control panel 28 comprises a temperature set control 66 which allows the incubator operator to select the desired temperature at which chamber 36 should be maintained. Temperature set control 66 comprises thumb wheel switches in the preferred embodiment of the present invention; however, other methods can be used to enter the temperature set point. Control panel 28 also comprises a temperature display 68 for indicating the current temperature of the incubator chamber 36 as measured by temperature sensor 48, the temperature display 68 being a three digit LED display in a preferred embodiment. The temperature set point control and display are suitably calibrated to degrees Centigrade as shown. The control panel also comprises three temperature indicators 70, 72 and 74 for indicating whether the chamber temperature is high, normal or low, respectively. The incubator control may further include a high limit temperature audible alarm, as in FIG. 2, which may be disabled through use of the silence selector 76. The control panel provides a safety set point control 78 whereby an operator can display the temperature at which an alarm condition would be generated. When control 78 is depressed, the temperature safety set point will be displayed by temperature display 68 as discussed in connection with FIG. 3A. In addition to temperature indicators, the control panel has a low water indicator 80 responsive to the float level sensor 58 discussed in connection with FIG. 2.

The control panel is further provided with a carbon dioxide set point control 82 allowing a user to select the desired concentration of carbon dioxide to be maintained within incubator chamber 36. Set point selector 82 is implemented, in a preferred embodiment of the invention, by means of thumb wheel switches. The carbon dioxide portion of the control panel further includes a carbon dioxide concentration display 84 for indicating the actual level of carbon dioxide within chamber 36 as measured by sensor 52. Both the $CO_2$ set point and display are calibrated in percentage of $CO_2$. The panel provides information regarding high, normal or low carbon dioxide level conditions with high level carbon dioxide indicator 86, normal carbon dioxide indicator 88 and low carbon dioxide indicator 90. In the preferred embodiment of the present invention, high, normal and low temperature indicators 70, 72 and 74 and high, normal and low carbon dioxide indicators 86, 88 and 90 are implemented utilizing light emitting diodes. The high and low temperature and carbon dioxide indicators 70, 74, 86 and 90 are preferably red colored, while normal indicators 72 and 88 are preferably green colored.

Figure 2A:
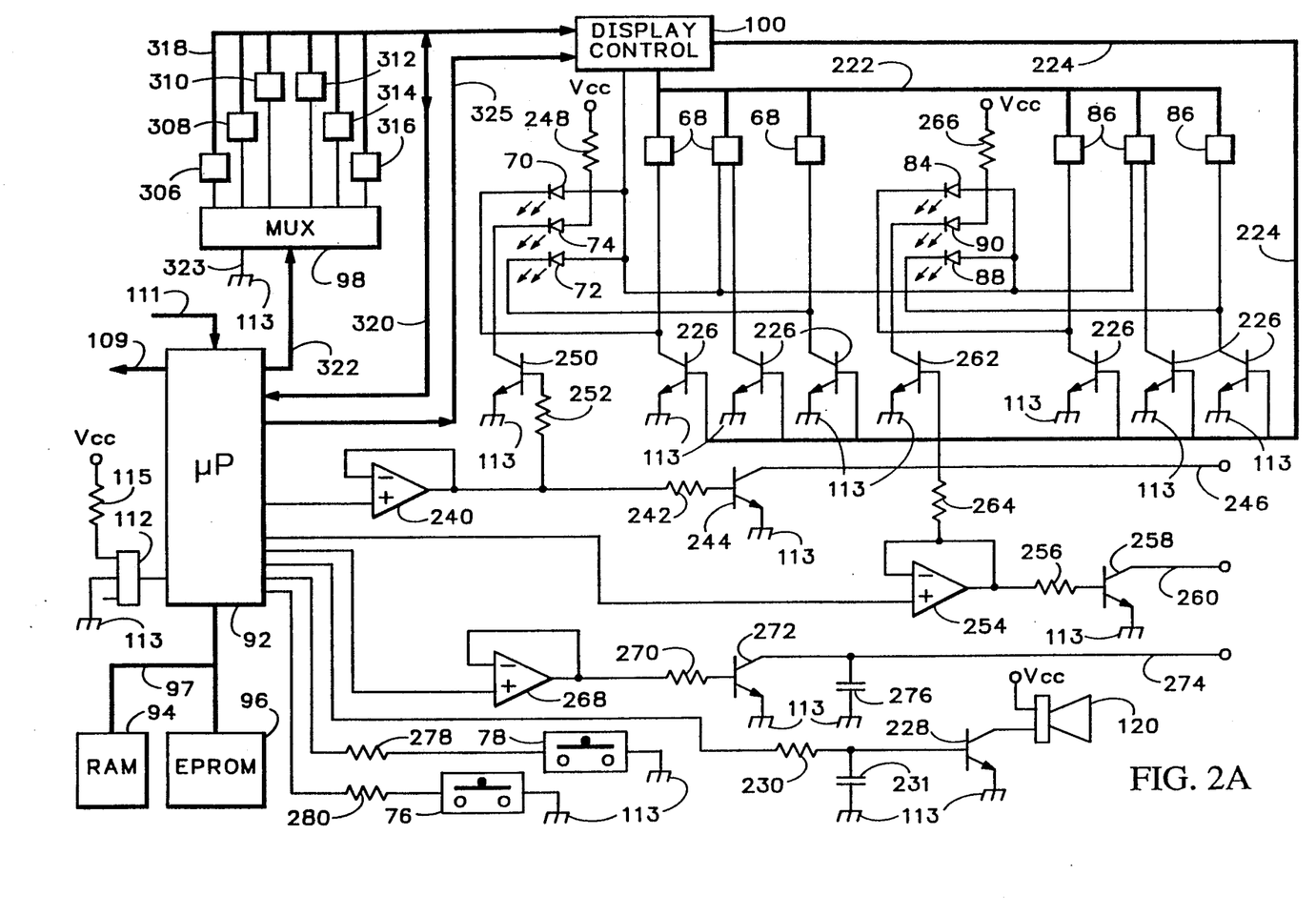
FIGS. 2A and 2B are combination block and schematic diagrams of control circuitry for operation of the incubator of the present invention.
Figure 2B:
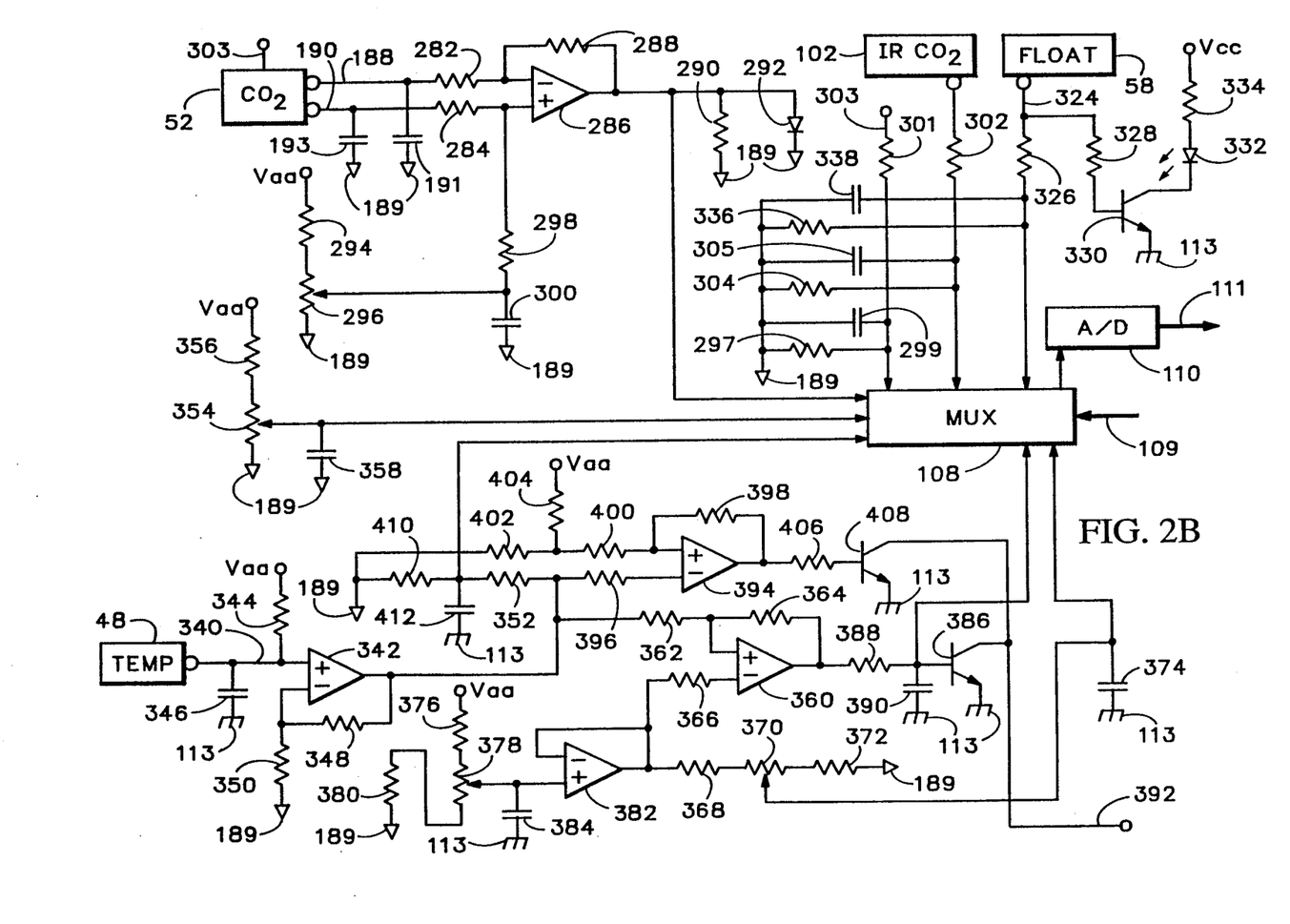

The operation of the control circuitry of the incubator of the present invention may be understood by referring to FIG. 2A and 2B which are combination block and schematic diagram of the circuitry of the controller. The heart of the controller is microprocessor 92 which is, in a preferred embodiment, an 80C451 microcontroller manufactured by Signetics. The microprocessor uses random access memory 94 and erasable programmable read only memory 96 for storing and operation of the controlling software as will be discussed herein in conjunction with FIG. 3. In a preferred embodiment of the present invention, random access memory 94 comprised a 2018 static 2048X8 RAM, while erasable programmable read only memory 96 comprised a 27C256 32,768X8 CMOS EPROM. RAM 94 and EPROM 96 have data and address line connections 97 running between microprocessor 92 and the RAM and EPROM.

Thumb wheel switches 66 and 82, as have been discussed hereinbefore with reference to FIG. 4, each comprise three separate switches: temperature control switches 66 comprise switch 306, switch 308 and switch 310, while $CO_2$ switches 82 comprise switch 312, switch 314 and switch 316. The common lead of each of switches 306, 308, 310, 312, 314 and 316 is connected to a data line of multiplexer 98, the output of each switch being connected to display controller 100 via data line 318, and to an input port of microprocessor 92 via data line 320. The selection lines 322 of multiplexer 98 are connected to an output port of microprocessor 92 and the output 323 of multiplexer 98 is returned to ground; thus, in operation, microprocessor 92 selects the desired thumb wheel switch 306 through 316 by selecting the appropriate multiplexer address line. With the appropriate line selected, the respective switch has its common lead connected to ground, allowing current to flow and provide the appropriate switch setting information on four data lines indicated at 318 and connected to display controller 100. Microprocessor 92 is also connected to data lines 318 via data lines 320, allowing the processor to read the setting of each switch. The connection of thumb wheel switches 66 and 82 to display controller 100, which is connected to displays 68, 70, 72, 86, 84, and 88 allows for displaying a digital read-out of temperature, high temperature warning, normal temperature indication, a digital read-out of $CO_2$ percentage, high $CO_2$ warning and normal $CO_2$ indication. In the preferred embodiment of the present invention, controller 100 is a 74C912 display controller chip, the address lines 325 of the display controller 100 being connected to an output port of microprocessor 92. The display data output lines 222 of display controller 100 are connected in parallel to each display element of the temperature display 68 and $CO_2$ display 86. Each display element is an MAN4940A display in an embodiment of the present invention. Display controller 100 has six display enable lines 224, each display line being connected to the base of one of six switching transistors 226. The emitter of each transistor 226 is connected to ground while the collector of each transistor is connected to an individual display element on displays 68 and 86. Transistors 226 are NPN type; in a preferred embodiment the transistors are 2N4401 transistors.

In operation, microprocessor 92 selects the appropriate thumb wheel switch by asserting the corresponding address lines of multiplexer 98. The setting of the selected switch will appear on data line 318, allowing microprocessor 92 to read the setting. Microprocessor 92 also uses data line 318 to supply current temperature and $CO_2$ data to display controller 100, wherein the processor will place a data value on line 318, and an address on line 325. Display controller 100 will then place an appropriate value on the display data lines 222 and will apply a high signal to the display enable line 224 corresponding to the display element 68 or 86 which is to receive the display data (determined by the address on line 325). All other display enable lines 224 will have a low voltage applied to them. Thus, the appropriate transistor 226, having a high voltage asserted on its base will switch on, allowing current flow from display element 68 or 86 and causing the display element to display the asserted data on lines 222. All other display elements, not asserted, will be off since the base of the corresponding switching transistors 226 will be low and each transistor will therefore be switched off, deasserting the appropriate element.

Microprocessor 92 also accesses the various sensors of the incubator; temperature sensor 48, $CO_2$ sensor 52, infrared $CO_2$ sensor 102, temperature calibration 104, safety calibration 106 and float switch 58 are all connected to multiplexer 108 as separate inputs. The signal output from multiplexer 108 (FIG. 2B) is coupled to the input of analog-to-digital converter 110 for converting sensor input signals into digital form. The digital representation from A/D converter 110 is then fed via data lines 111 to microprocessor 92 by way of an input port of the microprocessor. The microprocessor 92 controls selection lines 109 to multiplexer 108 in order to read the desired sensor according to the control program operating the microprocessor.

Figure 6:
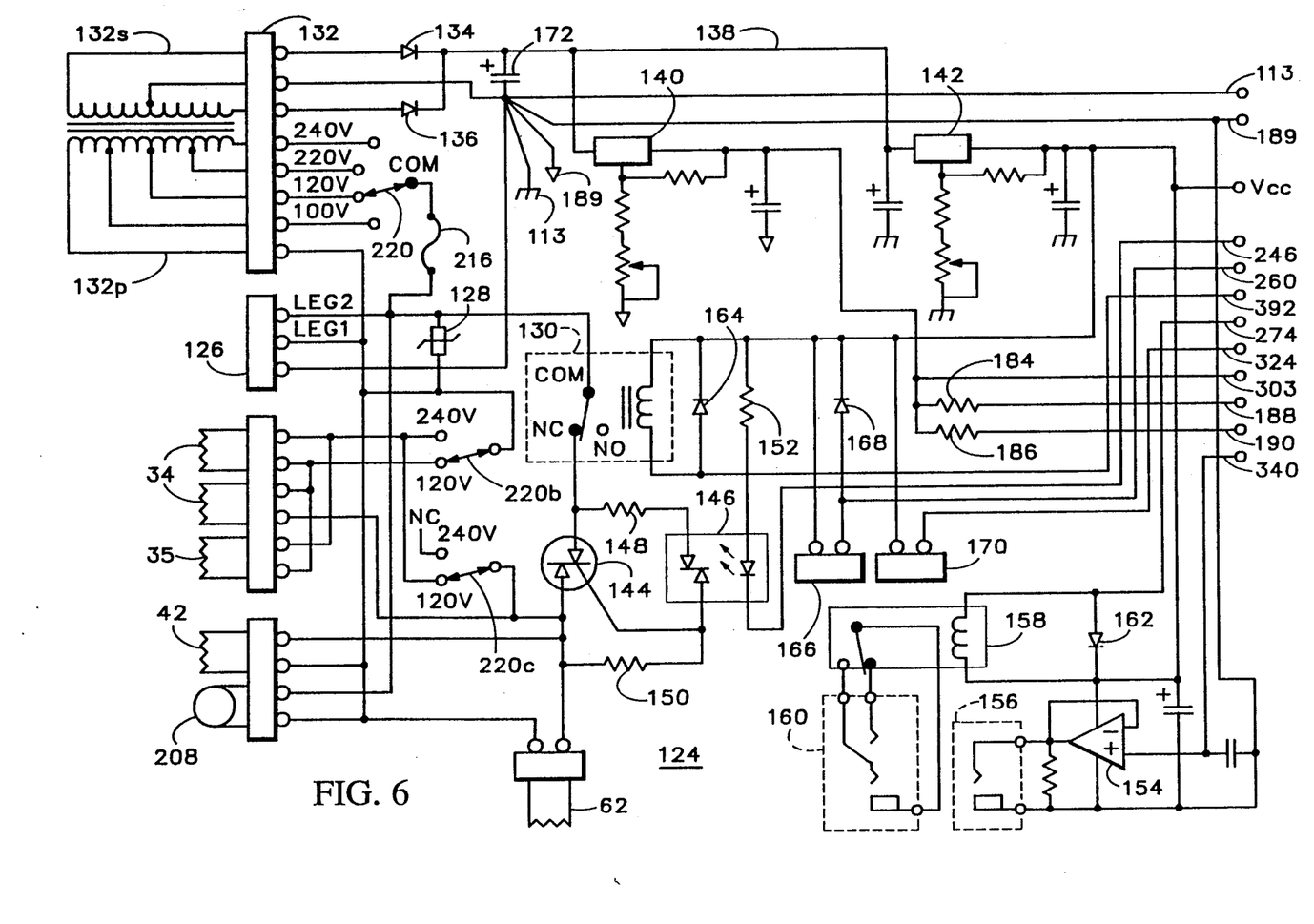
FIG. 6 is a schematic diagram of power circuitry employed with the present invention.

$CO_2$ sensor 52 is coupled to the control circuitry of the incubator through $CO_2$ sense line 188 and $CO_2$ reference line 190 also shown in FIG. 6. $CO_2$ lines 188 and 190 are connected through series resistors 282 and 284 to the inverting and noninverting inputs respectively of operational amplifier 286. Feedback resistor 288 returns the output of operational amplifier 286 to the inverting input while resistor 290 is disposed between the output of operational amplifier 286 and ground; diode 292 is connected in series between the output of operational amplifier 286 and ground, with the anode of diode 292 connected at the operational amplifier output and the cathode returned to analog ground 189. Operational amplifier 286 and its accompanying components boost the signal from $CO_2$ sensor 52 and provide isolation. The $CO_2$ amplifier also employs calibration components comprising resistor 294 and variable resistor 296 connected in series between the positive supply voltage and analog ground, with the movable contact of resistor 296 being coupled through series resistor 298 to the noninverting input of the operational amplifier. The movable contact of resistor 296 is further returned to analog ground through series capacitor 300. Operation of the movable contact of resistor 296 allows calibration of the output of amplifier 286 to provide a zero voltage output when the $CO_2$ level within the chamber of the incubator, as measured by $CO_2$ sensor 52, is zero. The output of $CO_2$ amplifier 286 is connected to an input line of multiplexer 108 to allow microprocessor 92 to read the sensor. A 7.35 volt drive signal for sensor 52 is provided on line 303, and through series resistor 301, to multiplexer 108, allowing the microprocessor to read and display the voltage for servicing purposes. The parallel combination of capacitor 299 and resistor 297 is disposed between the multiplexer side of resistor 301 and analog ground.

Infrared $CO_2$ sensor 102 is coupled through series resistor 302 to an input line of multiplexer 108, with the parallel combination of capacitor 305 and resistor 304 being disposed between the input line to multiplexer 108 and ground. While two separate $CO_2$ sensors are shown, in a preferred embodiment only one of the two sensors need be present and microprocessor 92 determines which $CO_2$ sensor is being used (sensor 52 or infrared sensor 102) based on $CO_2$ sensor selector 112 coupled to an input port of the microprocessor. In the preferred embodiment of the present invention, $CO_2$ sensor selector 112 comprises a selectable jumper which connects the input to digital ground 113 or to the positive supply voltage through series resistor 115.

In a preferred embodiment of the present invention, $CO_2$ sensor 52 comprises a HS-6 thermal conductivity sensor manufactured by Shabaura of Japan, while sensor 102 comprises a 2007-DHL-NAPCO infrared $CO_2$ sensor manufactured by Valtronics of California. The choice of sensor is typically based on preference; the thermal conductance sensor readings fluctuate with variations in humidity; however once a stable humidity is obtained within the incubator, such fluctuation will no longer be present. Infrared sensor 102 is not affected by humidity variations.

The control circuitry further comprises a heater relay control line 246, a $CO_2$ solenoid control line 260, an alarm relay control line 274 and an audio alarm 120. Heater relay control line 246, $CO_2$ solenoid control line 260 and alarm relay control line 274 are coupled to output ports of microprocessor 92 through appropriate buffering circuitry, as will be described herein. Heater relay buffer 240, which comprises an operational amplifier connected in a voltage follower configuration, has its noninverting input connected to a port on microprocessor 92 while the output of buffer 240 is returned to the inverting input. The output of amplifier 240 is coupled through series resistor 242 to the base of switching transistor 244, the emitter of which is connected to ground while its collector is connected to the heater relay control line 246 disposed in operational relationship to light operated triac 146 (in FIG. 6). Transistor 244 is suitably an NPN transistor and in a preferred embodiment comprises a 2N4401 type transistor. In operation, when microprocessor 92 wishes to activate the heater elements of the incubator, the microprocessor raises the output of the port connection to amplifier 240 causing the output of amplifier 240 to go high for turning transistor 244 on and allowing conduction through line 246. Triac 146 of FIG. 6 is activated whereby the heater elements are operated as described in connection with FIG. 6.

Microprocessor 92 also controls the operation of low temperature indicator 74, suitably taking the form of a light emitting diode. The light emitting diode has its anode connected to the positive supply voltage through series resistor 248 while the cathode of diode 74 is connected to the collector of switching transistor 250, the emitter of which is returned to digital ground while its base is coupled via resistor 252 to the output of operational amplifier 240. Thus, when microprocessor 92 raises the output line and turns on the incubator heaters, the output line of amplifier 240 goes high, switching the transistor on and allowing conduction through light emitting diode 74 for lighting the diode to indicate a low temperature condition. In a preferred embodiment, transistor 250 comprises a 2N4401 NPN transistor.

The incubator controller also comprises operational amplifier 254 which is connected in a voltage follower configuration with the noninverting input coupled to an output port of microprocessor 92, the inverting input and output being connected together, and the output coupled through series resistor 256 to the base of switching transistor 258. The emitter of transistor 258 is returned to ground while the collector is connected to $CO_2$ solenoid control line 260, also shown in FIG. 6. When microprocessor 92 raises the output port connection to operational amplifier 254, the amplifier output goes high thereby switching transistor 258 on, and allowing conduction on solenoid valve control line 260 for opening the solenoid valve as described hereinafter. The base of switching transistor 262 is also connected to the output of operational amplifier 254 through series resistor 264, while the emitter of transistor 262 is returned to digital ground and its collector is connected to the cathode of light emitting diode 90. The anode of light emitting diode 90 is empowered through series resistor 266 from the positive voltage supply. In operation, when microprocessor 92 turns on solenoid valve line 260, the output of operational amplifier is high, forcing the base of transistor 262 high for causing the transistor to conduct, whereby light emitting diode 90 emits light. Light emitting diode 90 indicates a low $CO_2$ condition within the incubator chamber.

Operational amplifier 268 is connected in a voltage follower configuration with its noninverting input responding to an output port of microprocessor 92 while the inverting input receives the amplifier output. The output of operational amplifier 268 is also coupled via series resistor 270 to the base of transistor 272, having its emitter returned to digital ground and its collector connected to alarm relay line 274, also shown in FIG. 6. Capacitor 276 is disposed in series between alarm relay line 274 and digital ground. When an alarm condition occurs, microprocessor 92 will raise the appropriate output port for raising the input to operational amplifier 268, whereby the output of operational amplifier 268 goes high forcing the base of transistor 272 high and allowing conduction through alarm relay line 274 to ground. As a result, the alarm relay 158 as described in connection with FIG. 6 is operated. In a particular embodiment of the present invention transistor 272 comprises a 2N4401 NPN transistor and operational amplifiers 240, 254 and 268 comprise LM324 operational amplifiers.

Audio alarm 120 is also coupled to an output port of microprocessor 92 via a driving transistor 228. The base of driving transistor 228 is coupled through series resistor 230 to the output port of microprocessor 92 and the emitter is returned to ground, while the collector is connected to audio alarm 120. Bypass capacitor 231 is disposed between base of transistor 228 and ground. In operation, when microprocessor 92 raises the appropriate output port, the base of transistor 228 goes high thereby causing transistor 228 to conduct, and allowing current flow through audio alarm 120 to ground, causing the alarm to sound. Safety set point switch 78 and alarm silence switch 76 are each connected in series between digital ground, and, through respective series resistors 278 and 280, to input ports of microprocessor 92. Switches 76 and 78 are, in the preferred embodiment of the present invention, normally open momentary switches which ground the corresponding input ports of microprocessor 92 when depressed.

Temperature sensor 48, in a preferred embodiment comprising an LM35C ten millivolt per degree Centigrade temperature sensor manufactured by National Semiconductor, is connected to the control circuitry via temperature sensor line 340, also shown in FIG. 6. Sensor 48 is provided power by connections to the positive supply and analog ground 189. Sensor line 340 is coupled to the noninverting input of operational amplifier 342, to the positive voltage through series resistor 344 and to digital ground 113 via series capacitor 316. Operational amplifier 342, which amplifies the input signal from sensor 48, is coupled in a noninverting configuration, with feedback resistor 348 disposed between the output and inverting input and series resistor 350 returning the noninverting input to ground. The amplified output is fed through series resistor 352 to an input of multiplexer 108 which allows microprocessor 92 to read sensor information. Resistor 410 completes a voltage divider arrangement to analog ground together with resistor 352, while capacitor 412 returns the junction of the resistor to analog ground.

Calibration of the temperature sensor is achieved through the use of temperature calibration variable resistor 354 connected in series with resistor 356 between the positive voltage supply and analog ground. The movable tap of resistor 354 is connected to an input of multiplexer 108 and returned to analog ground by means of capacitor 358. In operation, the setting of temperature calibration resistor 354 is read by microprocessor 92 through multiplexer 108 and A/D converter 110, and the resulting value is then subtracted from or added to the temperature reading provided by temperature sensor 48 and its accompanying circuitry through multiplexer 108 and A/D converter 110. It is thus possible to calibrate the temperature readings from sensor 48 at a reference temperature.

The control circuitry for the incubator also includes an analog temperature safety circuit which is connected to temperature sensor 48 and which provides an override in the event that microprocessor 92 fails to disconnect the heater in response to a high temperature condition. The analog temperature safety circuit includes operational amplifier 360, with its noninverting input connected to the output of operational amplifier 342 through series resistor 362 and its output returned to the noninverting input by means of resistor 364. The inverting input of amplifier 360 is connected by resistor 366 and resistor 368 in series to one terminal of variable resistor 370, the opposite terminal of which is returned to analog ground by way of resistor 372. The movable contact of resistor 370 is connected to an input of multiplexer 108 and to ground through capacitor 374. The analog safety circuit further comprises resistor 376 which is connected to the positive supply voltage and in series with variable resistor 378 and resistor 380 to analog ground. The movable contact of resistor 378 drives the noninverting input of operational amplifier 382 and is returned through series capacitor 384 to digital ground.

An operational amplifier 382, disposed in a voltage follower configuration, has its output connected to the inverting input as well as to the junction between resistors 366 and 368. Variable resistor 378 functions as the temperature safety set point control allowing the selection of a desired safety point at which the analog safety circuitry will disconnect the incubator heaters. Variable resistor 370 provides a "factory" calibration for the temperature safety, and is "read" by microprocessor 92 through multiplexer 108 and A/D converter 110. The analog safety circuitry further comprises switching transistor 386 having its base connected to the output of operational amplifier 360 through series resistor 388. Capacitor 390 is interposed between the base of transistor 386 and digital ground. The base of transistor 386 is also coupled to a multiplexer 108 input which allows microprocessor 92 to read the output of operational amplifier 360. Transistor 386 has its emitter returned to digital ground and its collector connected to temperature safety relay line 392, also shown in conjunction with FIG. 6. Operational amplifier 360 operates as a comparator, with the reference voltage level set by variable resistor 378, while its input voltage, a representation of temperature level, is provided by amplifier 342. If the output of temperature sensor amplifier 342 exceeds the temperature safety set point, the output of amplifier 360 will be driven sufficiently high to place transistor 386 into a conductive state thereby allowing current flow through temperature safety relay 130 of FIG. 6 and for removing power from the heater elements of the incubator.

A further safety feature is provided by operational amplifier 394 which has its inverting input connected to the output of amplifier 342 through resistor 396. The output of operational amplifier 394 is fed back to the noninverting input through resistor 398 and the noninverting input is returned to analog ground through series resistors 400 and 402. The juncture of resistors 400 and 402 is connected through series resistor 404 to the positive supply voltage. Resistors 404 and 402 form a voltage divider arrangement for placing a predetermined voltage on the noninverting input of amplifier 394. The output of operational amplifier 394 is coupled by way of series resistor 406 to the base of switching transistor 408, the emitter of which is connected to digital ground while the collector is attached to temperature safety line 392. Amplifier 394 operates as a comparator and functions as a temperature sensor malfunction detector. If the output of operational amplifier 342 is too low as a result of too low a temperature reading from temperature sensor 48, sensor 48 is presumed to have failed and the output of operational amplifier 394 will go high driving the base of transistor 408 high and thereby allowing conduction through transistor 408. Thus, current will flow through safety relay 130 of FIG. 6, opening the voltage supply to the incubator heaters. This circuitry will prevent incubator overheating in the event that temperature sensor 48 malfunctions, for example, by developing a short circuit. Since the temperature sensor reading, temperature calibration, temperature safety set point, and temperature safety calibration information are supplied to multiplexer 108, microprocessor 92 is able to read, use and display these values as appropriate.

Float switch 58, which has been described in connection with FIG. 1, is disposed between the +5 volt line (as shown in FIG. 6) and float switch control line 324. Float switch 58 is a normally open switch which will close when the fluid level within water jacket 32 falls below a certain level as a result of evaporation. The float switch is coupled through series resistor 326 to an input of multiplexer 108 and is also connected through series resistor 328 to the base of switching transistor 330, the emitter of which is tied to digital ground while its collector is connected to the cathode of light emitting diode 332. The anode of LED 332 is coupled via series resistor 334 to the +5 volt supply. In operation, when float switch 58 closes, line 324 will go high, thereby raising the base of transistor 330 such that the transistor conducts, allowing current flow through light emitting diode 332. LED 332, which is lit for indicating a low water condition, corresponds to low water indicator 80 of FIG. 4. Additionally, when the float sensor 58 conducts, a high signal is provided to multiplexer 108 and may be read by microprocessor 92 through A/D converter 110. Resistor 336, shunted by capacitor 338, is located between analog ground and the float sensor multiplexer input.

Referring to FIG. 6, the power control circuitry 124 includes a power entry connector 126 for coupling to the AC power mains. A varistor 128 is shunted across leg one and leg two of the power input lines to provide suppression of voltage spikes from the AC power source. Leg two of the power input is connected to the common contact lead of safety relay 130, while a diode 164 is connected across the operating coil of the relay, wherein the cathode of diode 164 is connected to the +5 volt ($V_{cc}$) side of the relay coil. Legs one and two of the AC line are connected to the primary of power transformer 132, the secondary of which provides a 9.5 volt AC output. The center tap of transformer secondary 132S is connected to analog ground 189 as well as to digital ground 113, and both these ground references are supplied to the circuitry of FIG. 2A and FIG. 2B.

The transformer 132 has a number of primary taps allowing the incubator to be used with various AC voltage configurations. In a preferred embodiment, transformer primary 132P is provided with taps corresponding to input voltages of 100 volts, 120 volts, 220 volts, and 240 volts. A selector 220 has a common point coupled to leg two of the incoming voltage line with the selection being made to connect the input to the appropriate transformer primary tap.

Connected in series with the output terminals of transformer secondary 132S are rectifying diodes 134 and 136 wherein the anodes of the diodes are connected to the transformer secondary and the cathodes of the diodes are connected to unregulated direct current line 138. Capacitor 172 is disposed between ground and line 138 to provide filtering. Voltage regulators 140 and 142 are each connected to line 138 and operate to maintain DC voltage levels. Regulator 140 is adjusted to provide 7.35 volts output and this voltage is supplied to thermal conductance carbon dioxide sensor 52 as shown in FIG. 2B via line 303. Voltage regulator 142 is adjusted to provide an output of 5.1 volts DC and this voltage is then supplied as $V_{cc}$ to the circuitry controlling the operation of the incubator.

Power control circuitry 124 also comprises triac 144 which has anode two connected to the normally closed contact of temperature safety relay 130 and anode one connected to electrical resistance heater elements 62, 42, 34 and 35 as shown. In operation, relay 130 is activated when the temperature within the incubator chamber exceeds a safety set point or when a temperature sensor malfunction is detected. If either of these two conditions occurs, transistor 408 or transistor 386 of FIG. 2B will turn on, current will flow through the relay and via safety line 392 to ground, actuating the relay and removing power from the various heating elements.

The gate of triac 144 is coupled to anode one of optically isolated triac 146 while anode two of triac 144 is further connected through series resistor 148 to anode two of triac 146. Anode one of triac 144 is also connected to resistor 150 which is disposed in series between triac 144 and anode one of triac 146. The anode of the input light emitting diode of optically isolated triac 146 is coupled through series resistor 152 to the +5 volt line while the cathode thereof receives the heater control line 246 of the microprocessor control circuitry discussed in connection with FIG. 2. In operation, when microprocessor 92 asserts a signal on heater control line 246 current will flow through the input diode of optically isolated triac 146 thereby causing triac 146 to conduct whereby triac 144 also conducts causing power to be applied to the various heating elements of the incubator.

Power circuitry 124 further comprises operational amplifier 154 which is connected in a voltage follower configuration with the noninverting input thereof connected to the output of temperature sensor 48 (see FIG. 2). The output of operational amplifier 154 is provided to output jack 156 and represents the temperature of the incubator chamber, made available for recording by an external recording device. Also on power control circuitry board 124 is alarm relay 158, having one leg of the relay coil connected to the +5 volt line and the other leg connected to output of alarm relay line 274 from FIG. 2. When microprocessor 92 asserts an alarm condition, current will flow on the alarm relay line through the coil of relay 158 causing the contacts thereof to switch. The "output" of relay coil 158 is connected to alarm jack 160 for connection with an external alarm response or sensing device. Diode 162 is disposed across the operating coil of relay 158 with the cathode of diode 162 connected to the +5 volt side of the relay coil.

Power control circuitry 124 also includes solenoid valve connector 166 disposed in series between the +5 volt line and solenoid valve control signal line 260 from microprocessor 92. Diode 168 is connected in series between the +5 volt line and the control signal side of solenoid valve connector. In operation, when microprocessor 92 provides an input on line 260, current will flow through the solenoid valve, to allow $CO_2$ to be injected into the incubator chamber. Float switch connector 170 is interposed in series between the +5 volt line and the float switch sensor signal line 324.

Fan motor 208 is connected across legs one and two of the AC input from power entry point 126. Heater elements 42 and 62 are disposed between leg one of the AC input and anode one of triac 144, which provides a circuit from leg two. Selectors 220b and 220c operate in conjunction with selector 220 to alternatively place the water jacket heaters 34 in parallel across the two AC power legs for 100 to 120 volt inputs or to place the water jacket heaters in series between AC power legs one and two for 220 to 240 volt inputs. Note that while more than one water jacket heater is employed in the illustrated embodiment, the number of water jacket heaters is not particularly critical. Fuse 216 is connected in series between leg two of the AC power input and transformer 132.

Referring now to FIG. 3A, the operation of the software controlling microprocessor 92 will be described. On initial power-up of the incubator, a controller reset, block 124, is executed which resets processor 92. Initialization of the hardware and software is then performed (block 126), resetting software variables, setting up a 250 microsecond clock for system operation, enabling system interrupts and beginning analog-to-digital conversion. The software then enters main loop 128 comprising the following steps: first, thumb wheel switches 66 and 82 are read, block 130, and converted to decimal values to determine the temperature and carbon dioxide set points. Second, the analog inputs are read in block 132 and converted to decimal values. The processor then executes proportional control block 134 which will be discussed in conjunction with FIG. 3B. Next check-safety-temperature block 136 is carried out by comparing the safety temperature setting with the current thumb wheel temperature setting and warning the user if the safety set point is too low in comparison with the thumb wheel temperature set point. The processor then enters check-for-key-pressed block 138, displaying the safety temperature set point if the safety key 78 (FIG. 4) is depressed and/or turning off the audio alarm 120 (see FIG. 2) if the alarm was on and the silence key 76 (FIG. 4) was pressed. The control-digital-output block 140 then either turns the heater relay on or off or turns the $CO_2$ solenoid on or off in relation to the results of block 134. Next, the the control-LEDs-and-8-segment-LED block 142 is entered which causes the temperature of chamber 36 to be displayed in display window 68 of FIG. 4 and the $CO_2$ value as measured by $CO_2$ sensor 52 to be displayed in $CO_2$ window 84. Block 142 will also light high or normal temperature indicators 70 and 72, and high or normal $CO_2$ indicators 86 and 88 as appropriate. Note that the microprocessor does not control the low water indicator 80. The float sensor 58 is directly connected to low water indicator 80 and a low water level will light indicator 80 directly (as described in connection with FIG. 2). However, microprocessor 92 is able to check the status of float switch 58 through multiplexer 108. Note also that low temperature indicator 74 and low $CO_2$ indicator 90 are controlled in conjunction with operation of heater control line 246 and $CO_2$ solenoid control line 260 as described in respect to FIG. 2. The control software will now return to the beginning of main loop 128 and begin execution again.

Figure 3B:
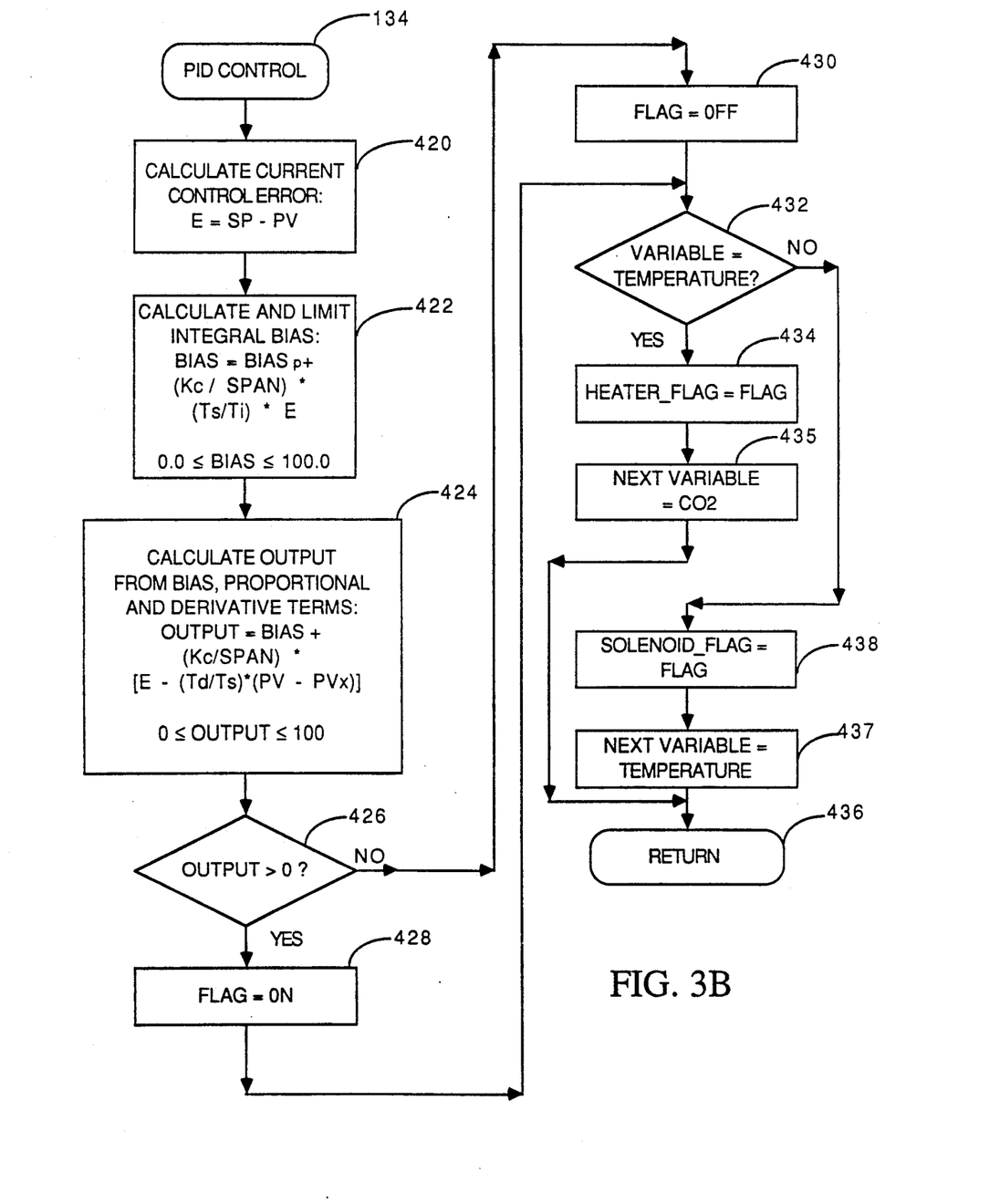
FIG. 3B is a detailed flow chart of the proportional control portion of the control software of the present invention.

Referring to FIG. 3B, the proportional control block 134 will now be described. The PID control process 134 comprises the step of determining the current error (E), block 420:

$$E = SP - PV,$$

where SP represents the current set point as determined by thumb wheel switches 68 or 84 and PV represents the value of the process variable as measured by $CO_2$ sensor 52 or temperature sensor 48. The process variable (PV), as currently measured, is subtracted from the set point (SP) as determined by the thumb wheels of control panel 28. Then, in block 422, the value of BIAS, which represents the integral term of the PID control, is calculated:

$$BIAS = BIAS_p + (K_c/SPAN)*(T_s/T_i)*E$$

The value $K_c$, a proportional constant, is determined empirically for each incubator chamber size and heater element wattages. This constant has a value between 0.0 and 100.0 and is divided by SPAN (which is the range of the process variable, for example, a 10° to 350° Centigrade range would provide a SPAN of 340) and then multiplied by the value $T_s$ divided by $T_i$, wherein $T_s$ is the sample time, i.e., how often the PID process control loop is executed, (for example, 1/10 of one second) and $T_i$ is the interval of required time for the process variable to raise from one value to another. Both $T_s$ and $T_i$ are determined experimentally. The quantity is then multiplied by the ERROR (E) value determined in block 420 and is added to $BIAS_p$ to provide the current value of BIAS. $BIAS_p$ (initially set to zero) is the value of BIAS from the previous execution of the PID control block for the current process variable. Process block 424 is then executed which determines the value of OUTPUT:

$$OUTPUT = BIAS + (K_c/SPAN) \cdot *[E - (T_d/T_s)*9PV - PV_x)]$$

OUTPUT is calculated from the ERROR quantity minus the quantity $T_d$ divided by $T_s$ multiplied by the difference of the current process variable, PV, and the value of the process variable during the previous loop execution, $PV_x$. This value is multiplied by $K_c$ divided by SPAN and the result is added to the value of BIAS from step 422 to produce OUTPUT; OUTPUT is limited to be between 0 and 100. $T_d$ represents the derivative constant, which is determined experimentally for each chamber size and heater wattage combination, and the $(T_d/T_s)(PV - PV_x)$ term provides the derivative portion of the PID control. If the process variable is increasing rapidly, output is thereby reduced to reduce overshoot.

In process block 426, OUTPUT is compared to zero. If OUTPUT is greater than zero, a FLAG is set to "ON" in block 428. If OUTPUT is not greater than zero then a FLAG is set to "OFF" in step 430. The program then enters block 432 which determines whether the current variable being processed is temperature or not. If the current variable is temperature, then blocks 434 and 435 are executed wherein the HEATER-FLAG is set to the value of FLAG and NEXT-VARIABLE is set to "$CO_2$". The process then enters block 436, return from subroutine. If in block 432 the current variable was not temperature, SOLENOID-FLAG is assigned the value of FLAG (block 438) and NEXT-VARIABLE is set to "TEMPERATURE" (block 437). The process returns to the main loop (block 436). Thus, it can be seen that the control function will alternate between checking and controlling the $CO_2$ variable and the temperature variable, with every other step being a temperature check and the intervening steps being a carbon dioxide check.

Figure 7A:
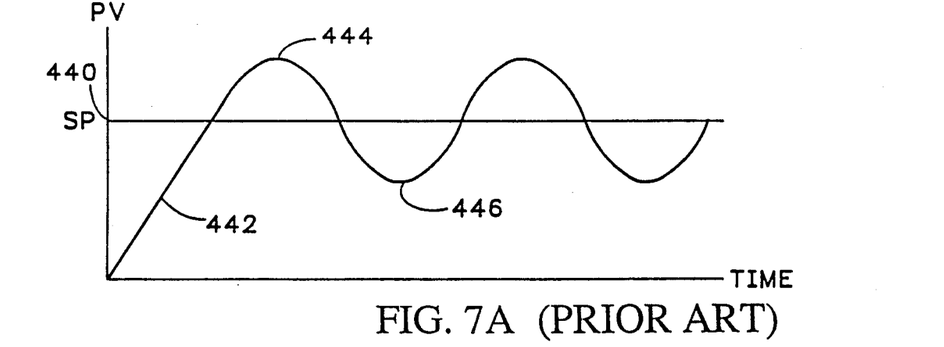
FIGS. 7A–7D are graphs illustrating the effects of control on the incubator.

Referring to FIGS. 7A through 7D the advantages of using proportional-integral-derivative control may be better understood. FIG. 7A illustrates the control of a process variable using on-off control of the prior art. The value of the process variable being controlled is graphed on the Y axis while the X axis represents time. Set point 440, which is illustrated by a horizontal line with a Y value of SP, is the desired value of a process variable, for example, as determined by the settings of thumb wheel switches 66 and 82. Upon starting the incubator control process, the measured value of the process variable will be low, thus resulting in the quantity E=SP−PV being greater than zero. In on-off control, the output will be set to on at any point when the process variable is less than the set point. With output set to on, the process variable will begin to rise as illustrated by line 442 extending from the origin to set point as time increases. When the process variable reaches set point, ERROR will go to zero, therefore resulting in the output being set to off. However, because of the delay in response to the change of output, the process variable will continue to rise above set point for a period of time resulting in overshoot of the set point. The process variable will reach a maximum at 444 and will then begin to fall until reaching the value of set point whereupon as the value continues to fall, ERROR will again be positive thereby resulting in output again being turned on. Because of the delay in response to output, the process variable will continue to fall to a point 446, at some value below set point. Then, once again, the value will begin to rise. As can be seen, the process variable will continue to oscillate above and below set point in a somewhat sinusoidal manner of FIG. 7A.

Figure 7B:
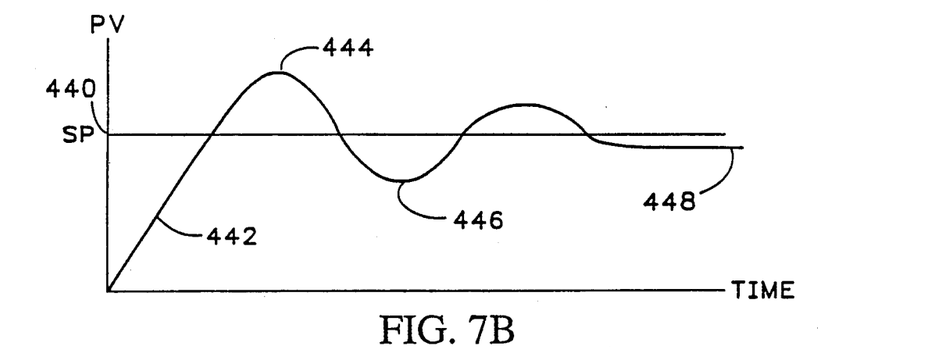
Figure 7C:
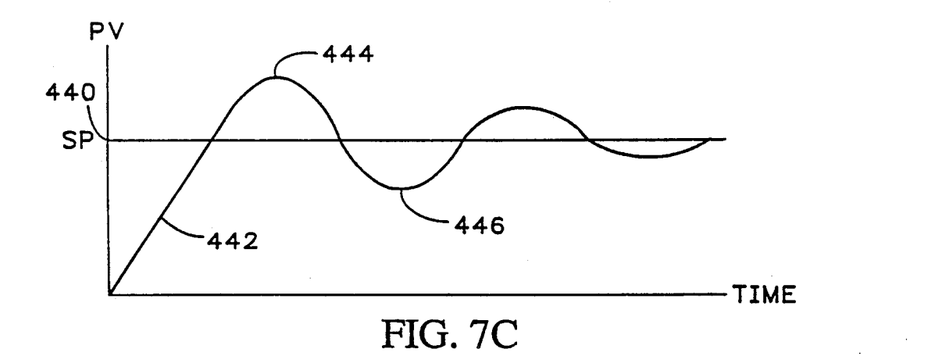
Figure 7D:
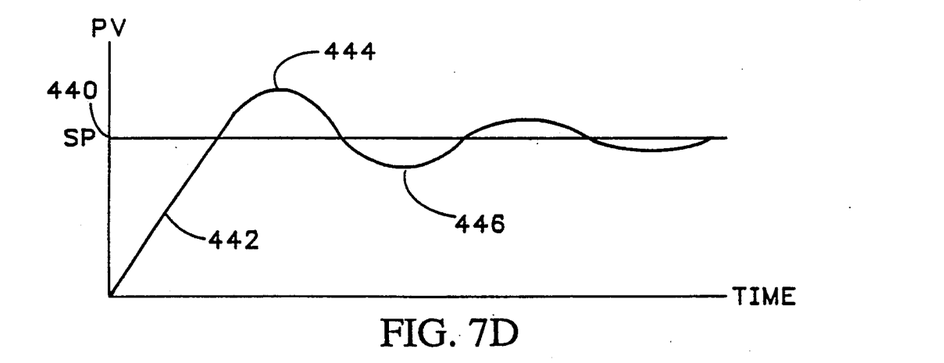

Referring now to FIG. 7B, the effect of adding proportional control to an incubator may be seen. As in FIG. 7A, the process variable will rise beyond set point to a maximum 444 and then continue oscillating in a sinusoidal manner. However, in proportional control, the output is a function of the quantity of error (OUTPUT=$K_c$/SPAN * (E)) and the sinusoidal oscillations will dampen and eventually be reduced to zero. The addition of the proportional control will result in the process variable settling out with a slight droop at 448, leaving the process variable slightly below the desired set point. Thus, the addition of the proportional-integral control, illustrated in FIG. 7C is desirable. As shown in FIG. 7C, the proportional-integral control output removes the droop 448 leaving the process variable at the desired set point. The proportional-integral control output corresponds to OUTPUT=BIAS+$K_c$/SPAN * (E). Finally, referring to FIG. 7D, the advantage of adding the derivative control may be seen. As in FIG. 7C, the droop of the proportional-only control is removed, and the additional advantage of reducing the overshoot 444 is achieved. The derivative factor corresponds to ($K_c$/SPAN) * [E−($T_d/T_s$) * (PV−$PV_x$)]. Thus, a greater increase in the process variable will result in a reduction of output, thereby reducing overshoot.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An automatic incubator comprising:
   a chamber having an entry door;
   a heat storage means in surrounding relation to said chamber;
   a first heater means for controllably heating said heat storage means;
   a second heater means disposed within said chamber for controllably heating the gaseous interior of said chamber;
   sensing means disposed in said chamber; and
   control means for operably actuating said heater means in response to input from said sensing means for controlling the temperature within said chamber to provide rapid recovery after access to said incubator via said entry door.

2. An incubator according to claim 1 wherein said control means comprises a microprocessor.

3. An incubator according to claim 1 wherein said heat storage means comprises a fluid filled jacket in surrounding relation to said chamber.

4. An automatic incubator comprising:
   a chamber having an entry door;
   a heat storage means in surrounding relation to said chamber;
   a first heater means for controllably heating said heat storage means;
   means for injecting gas within said chamber;
   means for directing gas flow within said chamber;
   a second heater means disposed in said gas flow within said chamber for controllably heating the gas in said gas flow;
   sensing means disposed in said chamber; and
   control means for operably actuating said heater means in response to input from said sensing means for controlling the temperature within said chamber to provide rapid recovery after access to said incubator via said entry door.

5. An incubator according to claim 4 wherein said control means comprises a microprocessor.

6. An incubator according to claim 4 wherein said sensing means comprises:
   a temperature sensing means; and
   an atmospheric gas concentration sensing means.

7. The incubator according to claim 6 wherein said atmospheric gas concentration sensing means comprises a carbon dioxide sensor disposed within said chamber.

8. An incubator according to claim 4 further comprising display means for displaying information from said sensing means.

9. An incubator according to claim 4 wherein said heat storage means comprises a fluid filled jacket in surrounding relation to said chamber.

10. An incubator according to claim 9 wherein said jacket is filled with water.

11. An incubator according to claim 9 further comprising:
    sensing means for determining the fluid level of said jacket; and
    alarm means for indicating that the fluid level in said jacket has fallen below a predetermined level.

12. An incubator according to claim 4 further comprising alarm means operable in response to information from said plurality of sensing means.

13. An incubator according to claim 4 wherein said means for directing gas flow comprises means for circulating atmospheric gas within said chamber.

14. An incubator according to claim 13 wherein said means for directing gas flow further comprises a channel, said channel being formed by a rear wall of said chamber and a false rear wall within said chamber.

15. An incubator according to claim 4 wherein said control means comprises microprocessor means providing proportional-integral-derivative control.

* * * * *